United States Patent
D'Angelo et al.

(10) Patent No.: US 7,913,245 B2
(45) Date of Patent: Mar. 22, 2011

(54) APPARATUS, SYSTEM AND METHOD FOR MODULAR DISTRIBUTION AND MAINTENANCE OF NON-"OBJECT CODE ONLY" DYNAMIC COMPONENTS

(75) Inventors: Dario D'Angelo, Los Gatos, CA (US); Kin Lau, Mountain View, CA (US); Alan Ray Smith, Gilroy, CA (US)

(73) Assignee: International Business Machines Corporation, Armonk, NY (US)

( * ) Notice: Subject to any disclaimer, the term of this patent is extended or adjusted under 35 U.S.C. 154(b) by 1309 days.

(21) Appl. No.: 11/425,669

(22) Filed: Jun. 21, 2006

(65) Prior Publication Data

US 2008/0022271 A1 Jan. 24, 2008

(51) Int. Cl.
*G06F 9/44* (2006.01)
(52) U.S. Cl. ......... 717/169; 717/175
(58) Field of Classification Search .......... None
See application file for complete search history.

(56) References Cited

U.S. PATENT DOCUMENTS

| | | | | |
|---|---|---|---|---|
| 5,758,340 A * | 5/1998 | Nail | ......... | 717/168 |
| 6,064,814 A * | 5/2000 | Capriles et al. | ......... | 717/116 |
| 6,064,821 A * | 5/2000 | Shough et al. | ......... | 717/174 |
| 6,237,144 B1 * | 5/2001 | Delo | ......... | 717/174 |
| 6,327,705 B1 * | 12/2001 | Larsson et al. | ......... | 717/174 |
| 6,349,408 B1 * | 2/2002 | Smith | ......... | 717/174 |
| 6,360,358 B1 * | 3/2002 | Elsbree et al. | ......... | 717/120 |
| 6,367,077 B1 * | 4/2002 | Brodersen et al. | ......... | 717/170 |
| 6,378,127 B1 * | 4/2002 | Delo | ......... | 717/174 |
| 6,405,362 B1 * | 6/2002 | Shih et al. | ......... | 717/174 |
| 6,434,744 B1 * | 8/2002 | Chamberlain et al. | ......... | 717/168 |
| 6,434,745 B1 * | 8/2002 | Conley et al. | ......... | 717/177 |
| 6,698,010 B1 * | 2/2004 | Yamanouchi et al. | ......... | 717/106 |
| 6,721,747 B2 * | 4/2004 | Lipkin | ......... | 709/209 |
| 6,735,601 B1 * | 5/2004 | Subrahmanyam | ......... | 1/1 |
| 6,823,508 B1 * | 11/2004 | Burkhardt et al. | ......... | 717/174 |
| 6,938,214 B2 * | 8/2005 | Proulx et al. | ......... | 715/763 |
| 7,076,778 B2 * | 7/2006 | Brodersen et al. | ......... | 717/170 |
| 7,380,214 B1 * | 5/2008 | Giormov | ......... | 715/772 |
| 2002/0083429 A1 * | 6/2002 | Rozenfeld et al. | ......... | 717/174 |
| 2002/0087966 A1 * | 7/2002 | Wiginton et al. | ......... | 717/174 |
| 2002/0100036 A1 * | 7/2002 | Moshir et al. | ......... | 717/173 |
| 2002/0129352 A1 * | 9/2002 | Brodersen et al. | ......... | 717/174 |
| 2003/0023963 A1 * | 1/2003 | Birkholz et al. | ......... | 717/172 |
| 2003/0084070 A1 * | 5/2003 | Kliewe | ......... | 707/200 |
| 2003/0154404 A1 * | 8/2003 | Beadles et al. | ......... | 713/201 |
| 2004/0177339 A1 * | 9/2004 | Plaisted et al. | ......... | 717/116 |
| 2004/0187103 A1 * | 9/2004 | Wickham et al. | ......... | 717/168 |
| 2004/0250245 A1 * | 12/2004 | Rao et al. | ......... | 717/168 |
| 2005/0015624 A1 * | 1/2005 | Ginter et al. | ......... | 713/201 |
| 2005/0114771 A1 * | 5/2005 | Piehler et al. | ......... | 715/536 |
| 2005/0223372 A1 * | 10/2005 | Borchers | ......... | 717/168 |
| 2006/0101458 A1 * | 5/2006 | Saad et al. | ......... | 717/174 |
| 2006/0136895 A1 * | 6/2006 | Barr et al. | ......... | 717/168 |

* cited by examiner

*Primary Examiner* — Tuan Q Dam
*Assistant Examiner* — Samuel Hayim
(74) *Attorney, Agent, or Firm* — Kunzler Needham Massey & Thorpe

(57) ABSTRACT

An apparatus, system, and method are disclosed for modular distribution and maintenance of non-"object code only" (OCO) dynamic components. OCO components comprise compiled executable modules. Non-OCO components comprise user readable and/or editable components. The modular distribution of non-OCO components comprises updating a skeleton data set comprising text and component fields such that user customizations and developer customizations are preserved. The modular distribution further allows for the generation of an output data in response to a reportable operational event, wherein the output data set is based on the skeleton data set and user customizations and developer customizations stored in customization data sets.

35 Claims, 7 Drawing Sheets

APPARATUS, SYSTEM AND METHOD FOR MODULAR DISTRIBUTION AND MAINTENANCE OF NON-"OBJECT CODE ONLY" DYNAMIC COMPONENTS

BACKGROUND OF THE INVENTION

1. Field of the Invention

This invention relates to the distribution and installation of maintenance updates of software products and more particularly relates to distributing and intelligently installing updates to software products without destroying user and developer customizations of already installed software products.

2. Description of the Related Art

Many software applications comprise "object code only" portions as well as text portions. The object code only or OCO portion of a software application is formatted to control the operation of a CPU (central processing unit) or other hardware device. The OCO portion is generally readable only by a computing device and not by humans. Likewise, the OCO portion is not easily modifiable by humans. In contrast, text portions of a software application may be readable and modifiable by human users, operators, and system administrators.

Software developers frequently use a compiler to translate a high level programming language into a compiled and executable OCO module. Software developers may also provide text modules to be read, interpreted, and manipulated by the OCO module. For example, an OCO module in an accounting software package may generate a profit and loss report. The OCO module may read a text file containing the name of the company and the federal tax identifier associated with the company and use these values to create the profit and loss report. The user of the accounting software package may modify the text file to update the name of the company and the federal tax identifier. The user may also insert headings into the text file that the OCO module may integrate into the final report.

The developers of the account software package may create text files to be stored on the user's computer that the OCO module will also incorporate into the final report. The developer text files may also be human readable files.

At some point, the manufacturer of the software package may ship a maintenance update for the software package. The maintenance update may comprise a replacement OCO module as well as replacement text files. Unfortunately, the maintenance update may overwrite the user customizations and the developer customizations contained in modified text files. The customizations may be lost and need to be reentered in the new files created by the maintenance update.

From the foregoing discussion, it should be apparent that a need exists for an apparatus, system, and method that preserve user and developer customizations while allowing updates to OCO modules and associated non-OCO components, in a software package. Beneficially, such an apparatus, system, and method would allow users and developers to customize a software application without having to reenter customizations following the integration of a maintenance update.

SUMMARY OF THE INVENTION

The present invention has been developed in response to the present state of the art, and in particular, in response to the problems and needs in the art that have not yet been fully solved by currently available apparatuses, systems, and methods for modular distribution and maintenance of non-"object code only" dynamic components. Accordingly, the present invention has been developed to provide an apparatus, system, and method for modular distribution and maintenance of non-"object code only" dynamic components that overcome many or all of the above-discussed shortcomings in the art.

The apparatus to accomplish modular distribution and maintenance of non-"object code only" dynamic components in one embodiment is a computer program product comprising a computer useable medium which when executed on a computer causes the computer to update a skeleton data set comprising text and component fields with a maintenance update for the computer program product, the maintenance update comprising one of a text update and a field update; parse the skeleton data set for component fields in response to a reportable operational event; integrate text from the skeleton data set and component values from a user customization data set and component values from a developer customization data set, wherein the component values correspond to the component fields; and generate an output data set comprising the text from the skeleton data set and the integrated component values.

The computer program product, in one embodiment, further causes the computer to integrate component values from a plurality of user customization data sets and a plurality of developer customization data sets.

The computer program product, in one embodiment, further causes the computer to identify an event code associated with the reportable operational event and a module name related to the reportable operational event and wherein the skeleton data set from which text is integrated is selected from the plurality of skeleton data sets according to the event code.

The computer program product, in one embodiment, is further configured such that each component field of the skeleton data set comprises a component token and a component field name, and each component value of the customer customization data set and each component value of the developer customization data set has an associated component field name such that each component field name of the skeleton data set corresponds with a component field name of one of the customer customization data set and the developer customization data set.

The computer program product, in one embodiment, is further configured such that the component field is human-readable and the component token is an alphanumeric character.

The computer program product, in one embodiment, is further configured such that integrating the text and component values comprises copying the skeleton data set and replacing the component fields with the component values to generate the output data set.

The computer program product, in one embodiment, is further configured such that the computer program product further causes the computer to send the output data set as an email to a user-selectable set of one or more email recipients.

The computer program product, in one embodiment, is further configured such that the skeleton data set comprises fixed-length records and the output data set comprises variable length records, wherein a component value may comprise a series of characters of arbitrary length.

The computer program product, in one embodiment, is further configured such that the skeleton data set comprises fixed-length records and the output data set comprises variable length records, and wherein a component value comprises a universal resource locator (URL) of arbitrary length.

The computer program product, in one embodiment, is further configured such that the URL comprises text and a subcomponent field and the computer program product replaces the subcomponent field with a component value from one of the customer customization data set, the developer customization data set, and runtime values associated with the reportable operational event to form a network usable URL.

In a further embodiment, the computer program product may cause a computer to parse a skeleton data set comprising text and component fields; select component values from a user customization data set and a developer customization data set, wherein the component values correspond to the component fields, the user customization data set configured to allow a user to modify the user customization data set, the developer customization data set configured to allow a developer to modify the developer customization data set; and generate an output data set comprising the text and the selected component values, wherein updates to the computer program product alter the skeleton data set while preserving customizations to the user customization data set and the developer customization data set.

The computer program product, in one embodiment, is further configured such that a user modifies the text and component fields of the skeleton data set and wherein modifications to the skeleton data set are overwritten by updates to the computer program product.

The computer program product, in one embodiment, is further configured such that parsing the skeleton data set occurs in response to detecting an abend condition.

The computer program product, in one embodiment, is further configured such that selecting component values from a user customization data set and a developer customization data set further comprises selecting those component values most recently modified.

The computer program product, in one embodiment, is further configured such that the computer program product further causes the computer to accept a user modification to a component value of the user customization data set such that each component value includes a timestamp indicating the modification time of the component value.

The computer program product, in one embodiment, is further configured such that selecting component values, for a component value that exists in a plurality of customization data sets, selects the component value with the most recent timestamp, wherein the component values in a customization data set that has not been modified each assume a timestamp equal to the creation date of the customization data set and a component value that has been modified assumes a timestamp equal to a modification time specific to the component value.

A method of the present invention is also presented for facilitating the reporting of software operational events while preserving end-user customizations. The method in the disclosed embodiments substantially includes the steps necessary to carry out the functions presented above with respect to the operation of the described apparatus and system.

In one embodiment, the method includes installing a software product on a mainframe computer system comprising: a parser, a skeleton data set, a developer customization data set, and a client customization data set, wherein the skeleton data set comprises text and a plurality of component fields, and wherein the developer customization data set comprises component values, and wherein the client customization data set comprises component values; updating a skeleton data set comprising text and component fields with a maintenance update for the software product, the maintenance update comprising one of a text update and a field update; detecting a reportable operational event in the mainframe computer system; deriving runtime component values based on the reportable operational event; parsing the skeleton data set for text and component fields; selecting component values from the user customization data set, from the developer customization data set, and from the runtime component values, wherein the selected component values correspond to the component fields of the skeleton data set; integrating text from the skeleton data set and the selected component values to generate an output data set comprising the text and the selected component values; and sending the output data set as an email to an email recipient.

The method may further operate such that the mainframe computer system further comprises a plurality of user customization data sets and a plurality of developer customization data sets.

In one embodiment of the method, the reportable operational event is an abend condition and the output data set is an abend report.

The method may further operate such that each component field of the skeleton data set comprises a component token and a component field name, and each component value of the customer customization data set and each component value of the developer customization data set has an associated component field name such that each component field name of the skeleton data set corresponds with a component field name of one of the customer customization data set and the developer customization data set.

The method may further operate such that detecting a reportable operational event further comprises identifying an event code associated with the event and a module name in related to the reportable operational event and determining a particular skeleton data set from which text is integrated further comprises selecting a skeleton data set from the plurality of skeleton data sets based on the event code.

The method may further operate such that generating an output data set further comprises copying the skeleton data set and replacing the component fields with the component values to generate the output data set.

The method may further operate such that the skeleton data set further comprises a pair of component switches enclosing an optional section of text and component fields, and wherein integrating text from the skeleton data set selectively incorporates the optional section based on a presence of a specific component value associated with the pair of component switches.

The method may further operate such that the pair of component switches comprise a begin switch and an end switch.

A further embodiment of a method for facilitating maintenance updates of to a mainframe event reporting software application while preserving end-user customizations wherein a mainframe event reporting software application comprises an executable module, a text-based skeleton dataset, a text-based user customization data set, and a text-based developer customization dataset is presented. The method, includes replacing the executable module with an updated version of the executable module and replacing the skeleton data set with an updated version of the skeleton data set without replacing or modifying neither the user customization data set nor the developer customization data set, wherein the mainframe event reporting software application in response to a reportable operational event: parses the skeleton data set for component fields, integrates text from the skeleton data set and component values from the user customization data set and component values from the developer customization data set, wherein the component values correspond to component fields, generates an output data set, and emails the output data set to a set of email addresses.

The method may further include making modifications to one of the user customization data set and the developer customization data set prior to replacing the skeleton data set such that the output data set contains the modifications.

A system of the present invention is also presented to facilitate software source code updates for mainframe applications to preserve end-user customizations and to generate event reports. The system may be embodied by various modules and components. In particular, the system, in one embodiment, includes a mainframe computer comprising a plurality of DASDs (direct access storage devices), a RAM (random access memory), and a plurality of CPUs (central processing units) configured to access the random access memory and the plurality of central processing units; a transactional hierarchical database program stored on at least one of the DASDs and configured to run on at least one of the CPUs; a skeleton data set comprising text and component fields stored on one of the DASDs; a user customization data set comprising component values stored on one of the DASDs; a developer customization data set comprising component values stored on one of the DASDs; an event reporting application comprising a parser module, a selection module, an integration module, and an email module, wherein: the application is stored on one of the DASDs and configured to run on one of the CPUs in response to a reportable operational event in the transactional hierarchical database program, the parser module is configured to parse the skeleton data set, the selection module is configured to select component values from the user customization data set, the developer customization data set, and runtime component values created as a result of the reportable operational event wherein the component values are selected according to corresponding component fields parsed by the parser module from the skeleton data set, the integration module is configured to generate an output data set comprising the text from the skeleton data set and the component values selected by the selection module, and the email module is configured to send the output data set as an email to one or more email addresses.

The system may further be configured such that the runtime component values comprise an event code associated with the reportable operational event and an event module name corresponding to the software module related to the reportable operational event.

The system may further be configured such that each component field of the skeleton data set comprises a component token and a component field name, and each component value of the customer customization data set and each component value of the developer customization data set has an associated component field name such that the component field names of the skeleton data set corresponds with component field names of the customer customization data set and the developer customization data set.

The system may further be configured such that the component field name is a human-readable name and the component token is an alphanumeric character.

The system may further be configured such that the skeleton data set comprises fixed-length records and the output data set comprises variable length records and wherein a component value may comprise a series of characters of arbitrary length.

The system may further be configured such that the series of characters comprise a universal resource locator (URL).

The system may further be configured such that the component token is one or more non-printing characters.

A tool in the form of a computer program product for modifying a user customization data set and a developer customization data set of the apparatus, method, and system described earlier is also presented. In one embodiment, the tool comprises: an edit module configured to modify component values stored in one of a user customization data set and a developer customization data set; and a field module configured to correlate component values with component fields stored in a skeleton data set comprising text and component fields; and a mainframe messaging module for facilitating software source code updates for a mainframe application to preserve end-user customizations configured to: update the skeleton data set with a maintenance update for the computer mainframe application, the maintenance update comprising one of a text update and a field update, parse the skeleton data set for component fields in response to a reportable operational event; integrate text from the skeleton data set and component values from the user customization data set and component values from the developer customization data set; and generate an output data set comprising the text from the skeleton data set and the integrated component values.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1:
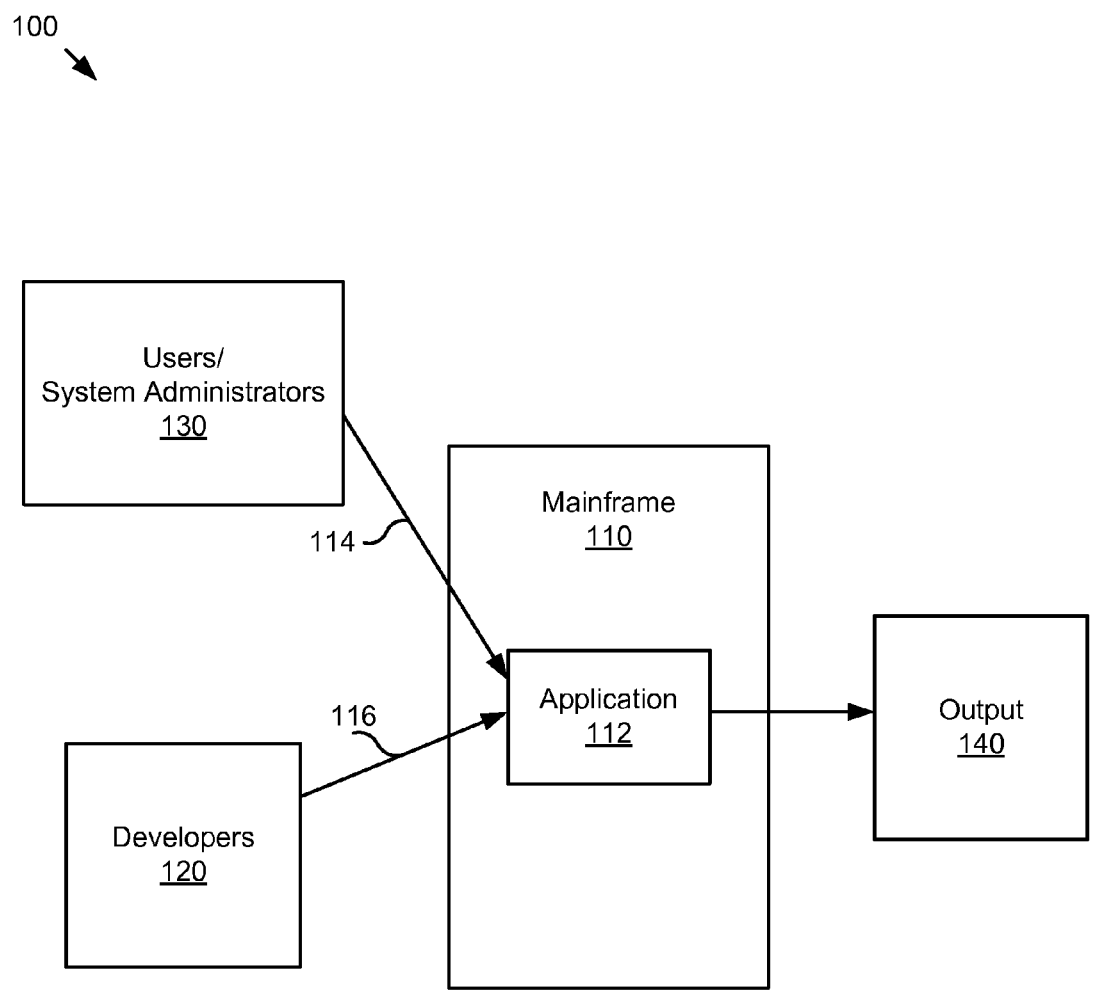
FIG. 1 is a schematic block diagram illustrating one embodiment of a system in accordance with the present invention.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Reference to a computer program of a computer useable medium and useable by a computer as part of a computer program product program may take any form capable of generating a signal, causing a signal to be generated, or causing execution of a program of machine-readable instructions on a digital processing apparatus. A computer readable medium may be embodied by random access memory, read only memory, flash memory, a transmission line, a compact disk, digital-video disk, a magnetic tape, a Bernoulli drive, a magnetic disk, a punch card, integrated circuits, custom VLSI circuits, gate arrays, or other digital processing apparatus memory devices or other devices capable of directing, modifying, or otherwise providing input to the processing of a digital processing apparatus.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams that follow are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

FIG. 1 depicts a system 100 for modular distribution and maintenance of non-object code only (non-OCO) dynamic components. The system 100 comprises users and/or system administrators 130, developers 120, a mainframe computer system 110, and a mainframe application 112 running on the mainframe computer system 110. In response to a reportable operational event, the system 100 creates an output 140. The output 140 may be an output data set 140, an email, or other communication that notifies users, operators, and/or others of the reportable operational event.

The application 112 may comprise one or more object code only modules along with one or more data sets editable by a user 130 or a developer 120. The system 100 allows users 130 to make user updates 114 and for developers 120 to make developer updates 116 to editable data sets in the application 112. However, when a system administrator applies maintenance updates to the application 112, the maintenance updates do not destroy the user updates 114 or the developer updates 116.

The application 112 generates the output 140 based on the original files associated with the application 112 as well as the user updates 114 and the developer updates 116. The application 112 may further incorporate runtime values and conditions that existed at the time of the reportable operational event in generating the output 140.

Figure 2:
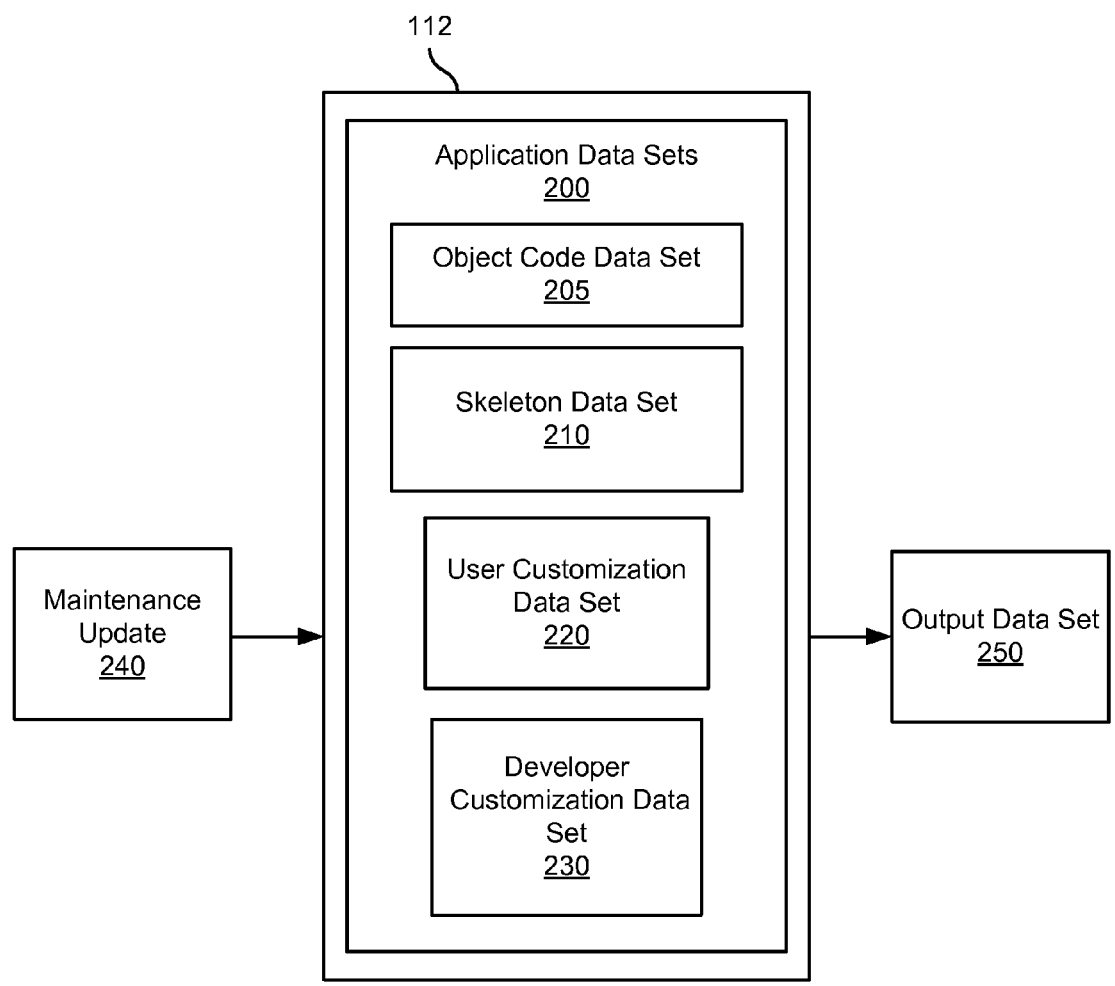
FIG. 2 is a schematic block diagram illustrating one embodiment of a mainframe application in accordance with the present invention.

FIG. 2 depicts an expanded view of application 112. The application 112 may comprise several files or application data sets 200. The application data sets 200 may comprise data sets stored on a hard disk, on a magnetic tape, on an optical disk, in random access memory of the mainframe computer system 110 or other storage media. The application data sets 200 may comprise one or more object code data sets 205, skeleton data sets 210, user customization data sets 220, and developer customization data sets 230.

An object code only data set 205 may comprise computer executable code compiled into an OCO format. A user 130 generally does not modify an object code only data set 205. Rather, a user 130 reports problems with an object code only data set 205 to the manufacturer of the application 112.

The skeleton data set 210 may comprise human-editable text as well as component fields. The text may comprise the skeleton of a report, email message, or other document. The component fields may comprise insertion points at which variable values may be updated depending on the component values selected from a user customization data set 220, a developer customization data set 230, and/or runtime component values. A user 130 may edit the skeleton data set 210. However, changes to the skeleton data set 210 may be lost as described below.

A user customization data set 220 may comprise component values. A user 130 may modify component values in a user customization data set 220. In response to a reportable operational event, the application 112 may integrate component values in a user customization data set 220 with text from a skeleton data set 210 to create an output data set 250.

A developer customization data set 230 may also comprise component values. A developer 120 may modify component values in a developer customization data set 230. In response to a reportable operational event, the application 112 may integrate component values in a developer customization data set 230 with text from a skeleton data set 210 to create an output data set 250.

As bugs in the object code only data set 205 are identified and fixed, a developer 120 or the manufacturer of the application 112 may ship maintenance updates 240. A maintenance update 240 may contain replacement application data sets 200. However, generally, the maintenance update 240 only contains replacements for the object code data sets 205 and the skeleton data set 210. The user customization data set 220 and the developer customization data set 230 are not updated by a maintenance update 240. Through this design, the user updates 114 and the developer updates 116 made to the user customization data set 220 and the developer customization data set 230, respectively, are preserved across maintenance updates 240.

Figure 3:
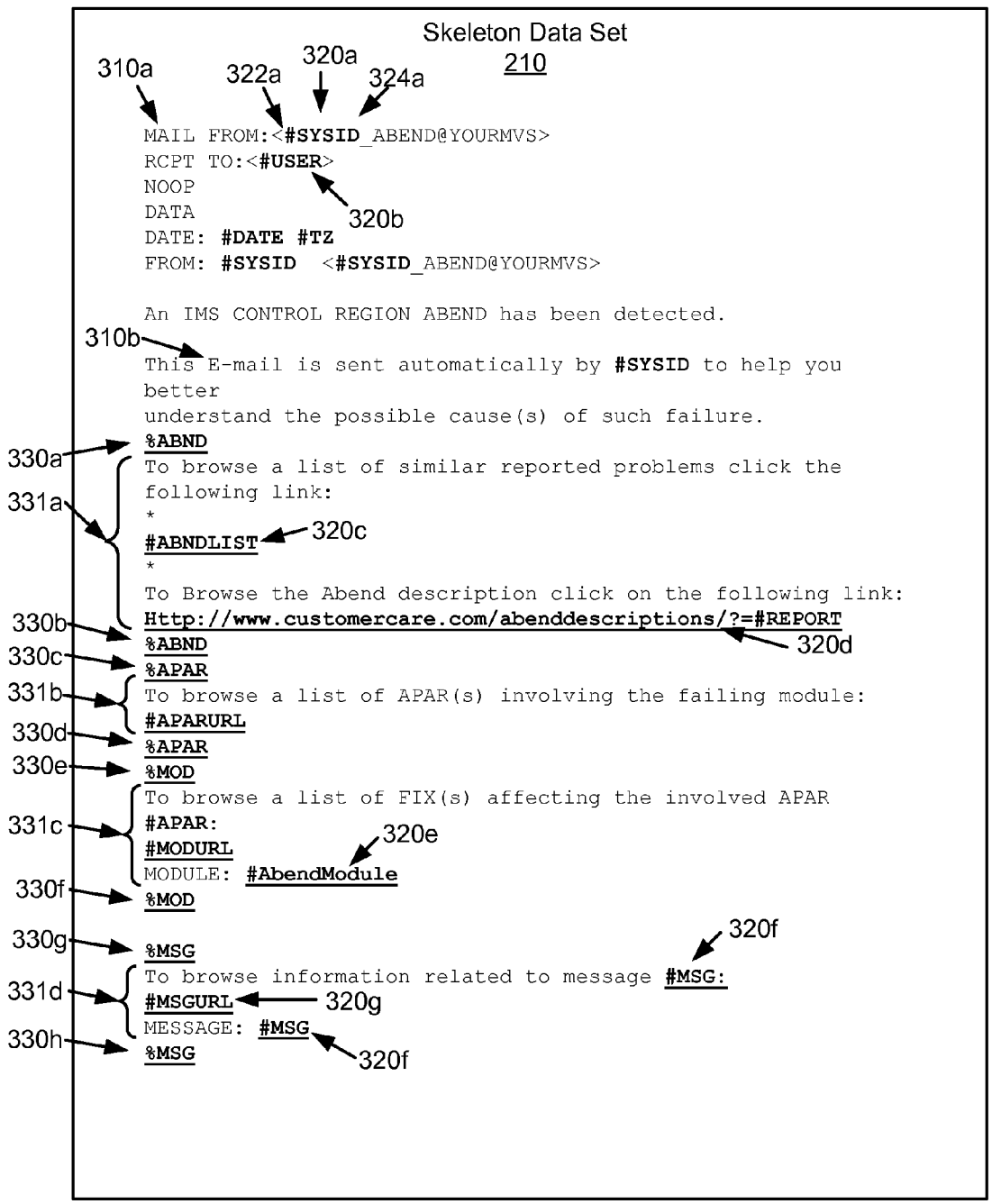
FIG. 3 is an illustration of one embodiment of a text-based skeleton data set in accordance with the present invention.

FIG. 3 depicts one embodiment of one example of a skeleton data set 210. The depicted embodiment is a skeleton email report of an abend condition on an application 112. However, those of skill in the art will understand that other types of skeleton data sets 210 could be given for other types of skeleton data sets 210 such as a text file event report, a printed event report, or a scripted response to a reportable operational event, an error condition, or other operating condition.

The depicted skeleton data set 210 comprises text fields 310, component fields 320, and optional tags 330. The depicted skeleton data set 210 provides a template for an email report. However, the skeleton data set 210 of the present invention is not limited to email reports. The skeleton data set 210 may comprise a template for a customization file, a generated report, or other data set which requires customization. The skeleton data set 210 provides a template for a customized output data set 250. In the depicted skeleton data set 210 of FIG. 3, the final output data set 250 is an email report of an abend condition related to a mainframe application 112.

The text fields 310 comprise strings of text that pass unmodified from the skeleton data set 210 to the output data set 250. For example, text field 310a comprises the text string "MAIL FROM:<". The final output data set 250 also contains the text field 310a "MAIL FROM:<". (See element 510a in FIG. 5). Similarly, text field 310b comprises a string of text beginning with the words "This E-mail is . . . ".

In contrast, the component fields 320 may comprise a component token 322 and a component field name 324. As an example, component field 320a comprises a "#" character for a component token 322a and the character string "SYSID" as a component field name 324a. Together, the "#SYSID" component field 320a is a replaceable string of text. Those of skill in the art will be able to determine other means to construct a component field 320, all of which are considered within the scope of the present invention. For example, other characters may be used for component tokens 322 including non-printing characters. Similarly, a component token 322 may comprise a beginning and an ending flag or a length field to allow component tokens 322 and/or component field names 324 of arbitrary length.

FIG. 3 further depicts a component field 320b, "#USER," component field 320c, "#ABNDLIST," component field 320d "#REPORT," and component field 320e, "#AbendModule." Note that component field 320d completes a URL (universal resource locator) as shown in FIG. 3. The component field 320d provides a variable name to complete the URL. Thus, a URL in the final output data set 250 may be generated by the combination of a text field 310 and a component field 320.

The skeleton data set 210 may further comprise various optional tags 330, for example optional tag 330a, optional tag 330b, optional tag 330c, optional tag 330d, optional tag 330e, optional tag 330f, optional tag 330g, and optional tag 330h. An optional tag 330 indicates or delimits optional sections 331 that comprise text fields 310 and/or component fields 320 that are optional and may or may not be included in the final output data set 250.

In one embodiment of an optional tag 330, the first optional tag 330 is a start option field and a second matching optional tag 330 is an end option field. For example, optional tag 330a, "% ABND" is a start option field and optional tag 330b, "% ABND" is an end option field. Other means, tokens, and/or methods could be designed by those of skill in the art without departing from the spirit of the invention.

The optional tags 330 identify optional sections 331 of the skeleton data set 210. An optional section 331 may be included in the final output data set 250 depending on predetermined circumstances. In one embodiment, the optional section 331a between the optional tags 330a and 330b is included in the final output data set 250 only if a value for component field 320 is defined. Values for component fields 320 are defined in a user customization data set 220, a developer customization data set 230, or as a runtime value. As described below with respect to FIGS. 4 and 5, each component field 320 may take on an associated component value. An optional section 331 may be included in the final output data set 250 if the optional tags 330 have a corresponding value and/or the included optional tags 330 have a corresponding value. Thus, the optional tag 330a may have a value of "true." If such is the case, the optional section 331a is included. Additionally, an optional section 331 may be included if the component fields 320 in the optional section 331 have defined values. Thus, in optional section 331a, the optional section 331 is included if both component field 320c and component field 320d have values.

Similar exemplary optional sections 331 are illustrated as optional section 331b, optional section 331c, and optional section 331d. In the case of optional section 331d between the optional tag 330g and the optional tag 330h, the optional section is included only if the component fields 320, for example, the component fields 320f, "#MSG," and the component field 320g, "#MSGURL", in the optional section 331d are defined. A component field 320 is defined if it has an associated value. Thus, if the component field 320f and the component field 320g are defined in either the user customization data set 220 or the developer customization data set 230, then the optional section 331d between optional tag 330g and optional tag 330h is included in the output data set 250. Otherwise, the optional section 331d is not generated for the output data set 250.

Figure 4:
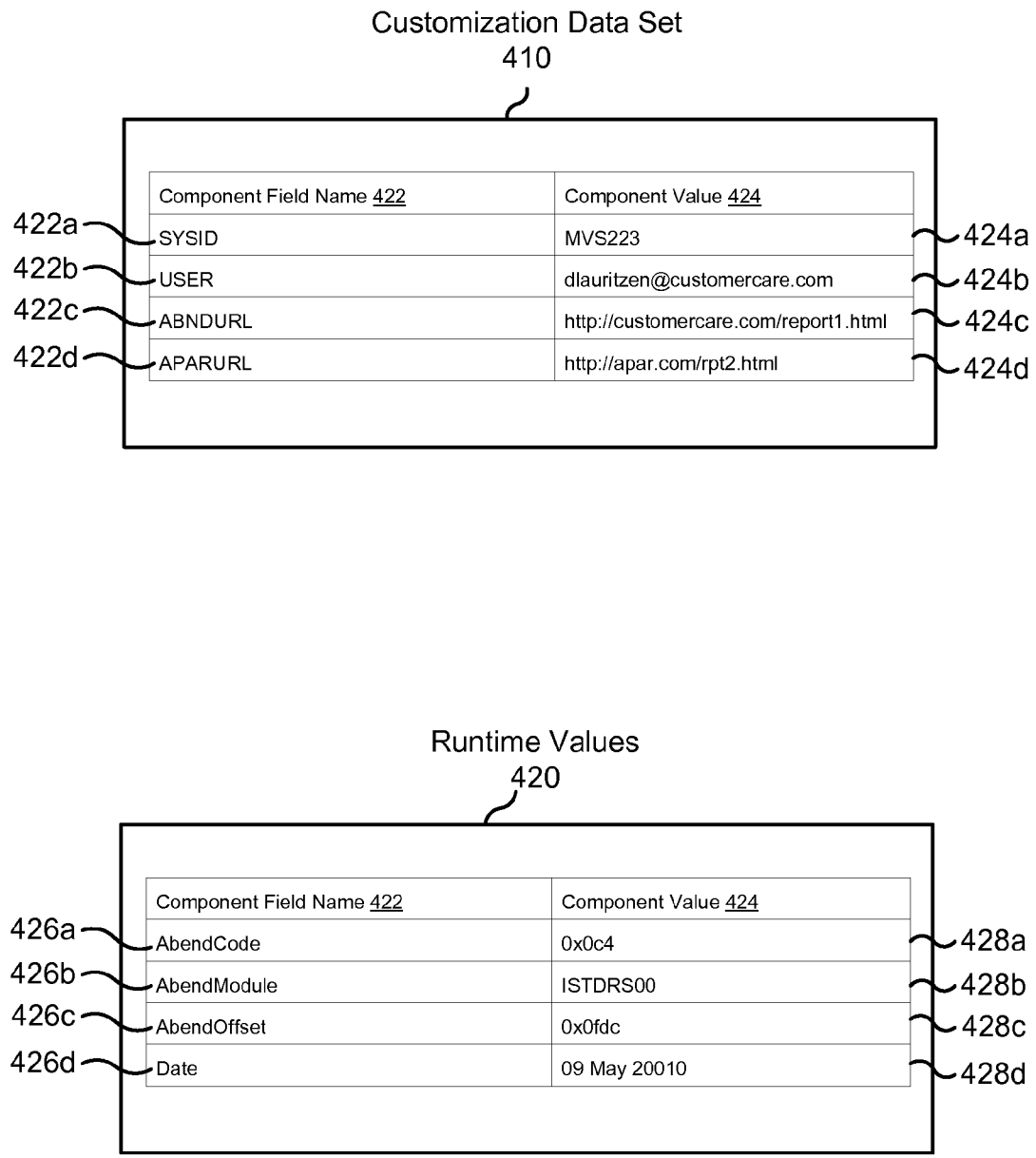
FIG. 4 is a block diagram of a customization data set and runtime values in accordance with the present invention.

FIG. 4 depicts one embodiment of a customization data set 410 and runtime values 420. The customization data set 410 may be a user customization data set 220 or a developer customization data set 230. The customization data set 410 comprises component values 424 associated with component field names 422. For example, the component value MVS223 424a is associated in the customization data set 410 with the component field name SYSID 422a. Similarly, component values 424b-d are associated with component field names 422b-d. The runtime value 420 maintains the component values 424 of each component field name 422.

In some embodiments of the invention, a plurality of customization data sets 410 may be used. For example, a user customization data set 220 and a developer customization data set 230 may be used to track overlapping component values 424. In such instances, the customization data sets 410 may be further configured to track the time at which changes to a particular component value 424 are made. In this manner, the customization data set 410 may keep a historical record of which component value 424 was most recently modified among a plurality of customization data sets 410.

In addition to the customization data sets 410, the system 100 may track runtime values 420 comprising component values 424. The runtime values 420 may overlap with the component values 424 of the customization data sets 410. However, the runtime values 420 may also comprise additional information not available until a program is actually executing and an operating condition occurs. For example, in one embodiment, a runtime component value 424 may comprise a component value 428a equal to 0x0c4 corresponding to a AbendCode 426a. Similarly, a component value 428b of ISTDRS00 may correspond to a component field name 422 of AbendModule 426b. Component values 428c-d may correspond to component field names 426c-d as shown.

Figure 5:
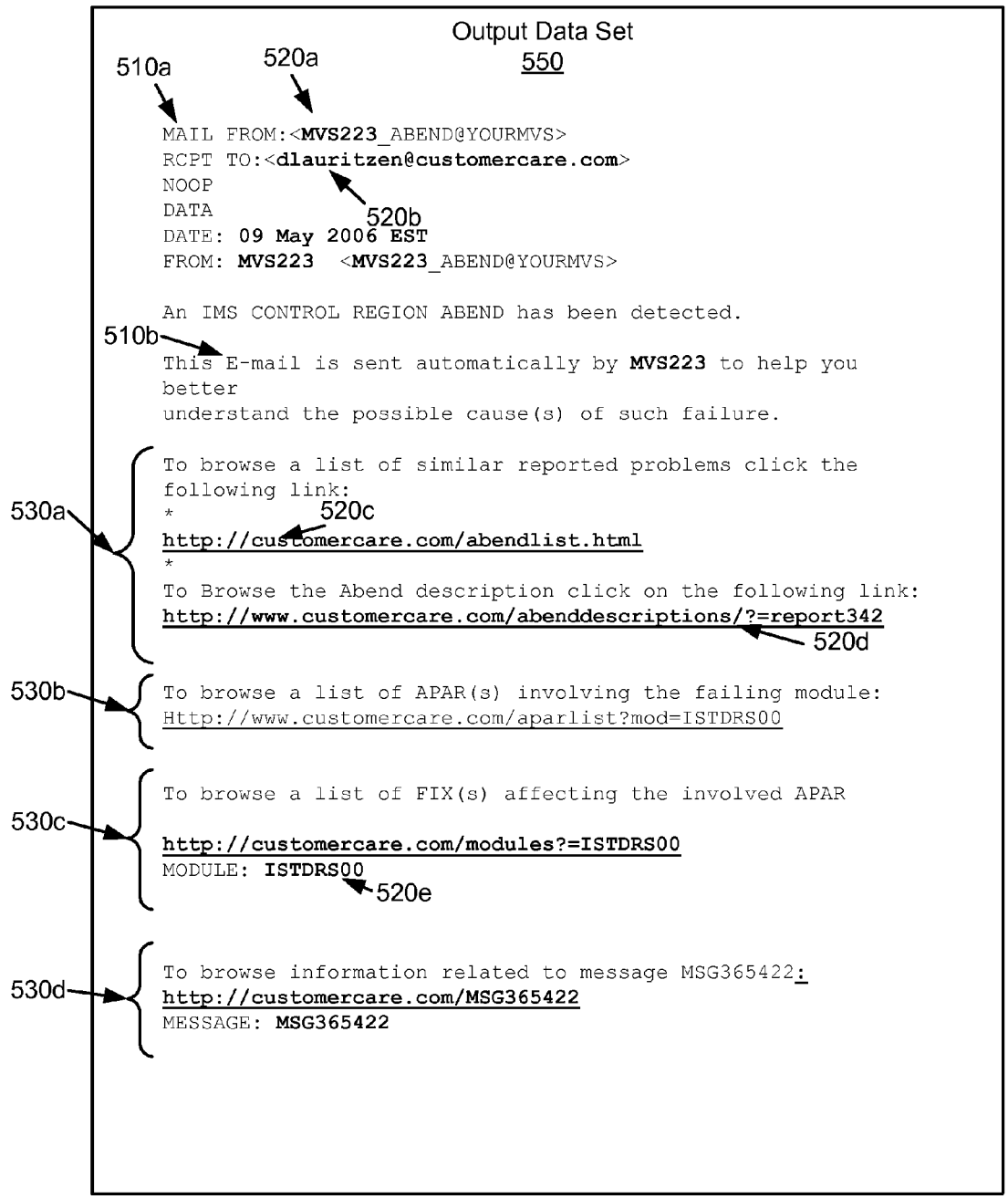
FIG. 5 is an illustration of one embodiment of a text-based output data set in accordance with the present invention.

FIG. 5 depicts one embodiment of an output data set 550 that corresponds to the skeleton data set 210 of FIG. 3 and the customization data set 410 and the runtime values 420 of FIG. 4. In the illustrated embodiment, the output data set 550 comprises various text fields 510, for example 510a and 510b. The text fields 510 correspond to text fields 310 from a skeleton data set 210, for example the skeleton data set 210 of FIG. 3.

The output data set 550 further comprises various completed component fields 520, for example completed component field 520a, completed component field 520b, completed component field 520c, completed component field 520d, and completed component field 520e. Each completed component field 520 corresponds to a component field 320 from a skeleton data set 210 that has been completed using component values 424 from either a customization data set 410 or from a runtime value 420. For example, the completed component field 520a contains the component value 424 "MVS223" taken from the example customization data set 410 shown in FIG. 4 as component value MVS223 424a. Similarly, the completed component field 520b comprising the email address "dlauritzen@cutomercare.com" corresponds to component value 424b from FIG. 4.

FIG. 5 further comprises four included optional sections 530: 530a, 530b, 530c, and 530d. Each optional section 530 in the illustrated embodiment corresponds to an optional section 331 from FIG. 3. The various completed component fields 520, for example 520c, 520d, and 520e, correspond to component field 320 from FIG. 4.

Figure 6:
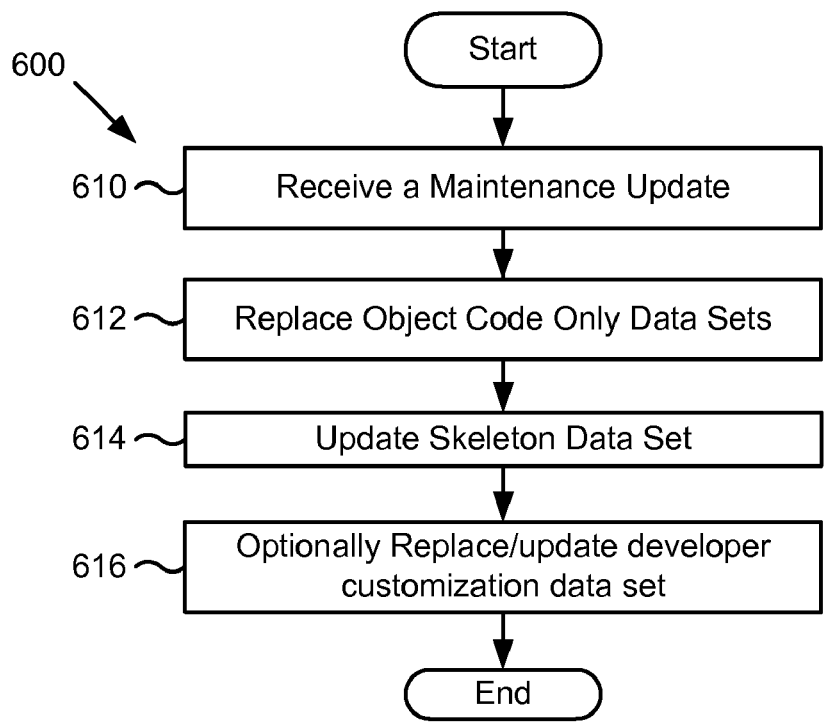
FIG. 6 is a schematic flow chart diagram illustrating one embodiment of a method to apply a maintenance update.

FIG. 6 depicts one embodiment of a method 600 for applying a maintenance update for a mainframe application 112 in accordance with the present invention. The method 600 may comprise receiving 610 a maintenance update 240, replacing 612 an object code only data set 205, updating 614 a skeleton data set 210, and optionally replacing/updating 616 a developer customization data set 230.

A maintenance update 240 may be shipped by the manufacturer of a mainframe application 112. Alternatively, a system administrator may request a maintenance update 240. A maintenance update 240 primarily replaces one or more object code data sets 205. However, a maintenance update 240 may also comprise updates for text files (non-OCO data) such as skeleton data sets 210, user customization data sets 220, and developer customization data sets 230. In accordance with the present invention, the maintenance update 240 is designed to preserve any user customization data sets 220. In this manner, the maintenance update 240 does not cause user customizations stored in a user customization data set 220 to be lost.

The application of the maintenance update 240 may replace 612 or update one or more object code data sets 205. The maintenance update 240 may be a general release to all users of a particular application 112. Alternatively, the maintenance update 240 may address a specific bug or abend experienced by a single customer or installation of the application 112.

The maintenance update 240 may update 614, modify, or replace a skeleton data set 210. At times, users 130 and/or system administrators may modify the skeleton data set 210. In those cases, the maintenance update 240 may overwrite or destroy such customizations. However, the maintenance update 240 does not overwrite or destroy customizations created in a user customization data set 220.

The maintenance update 240 may optionally replace/update 616 a developer customization data set 230. The maintenance update 240 is designed by developers 120. As such, the developers 120 may determine that replacing prior developer updates 116 is desirable. In such a case, the maintenance update 240 replaces/updates 616 the developer customization data set 230. However, generally, the developer updates 116 are persevered across maintenance updates 240.

Figure 7:
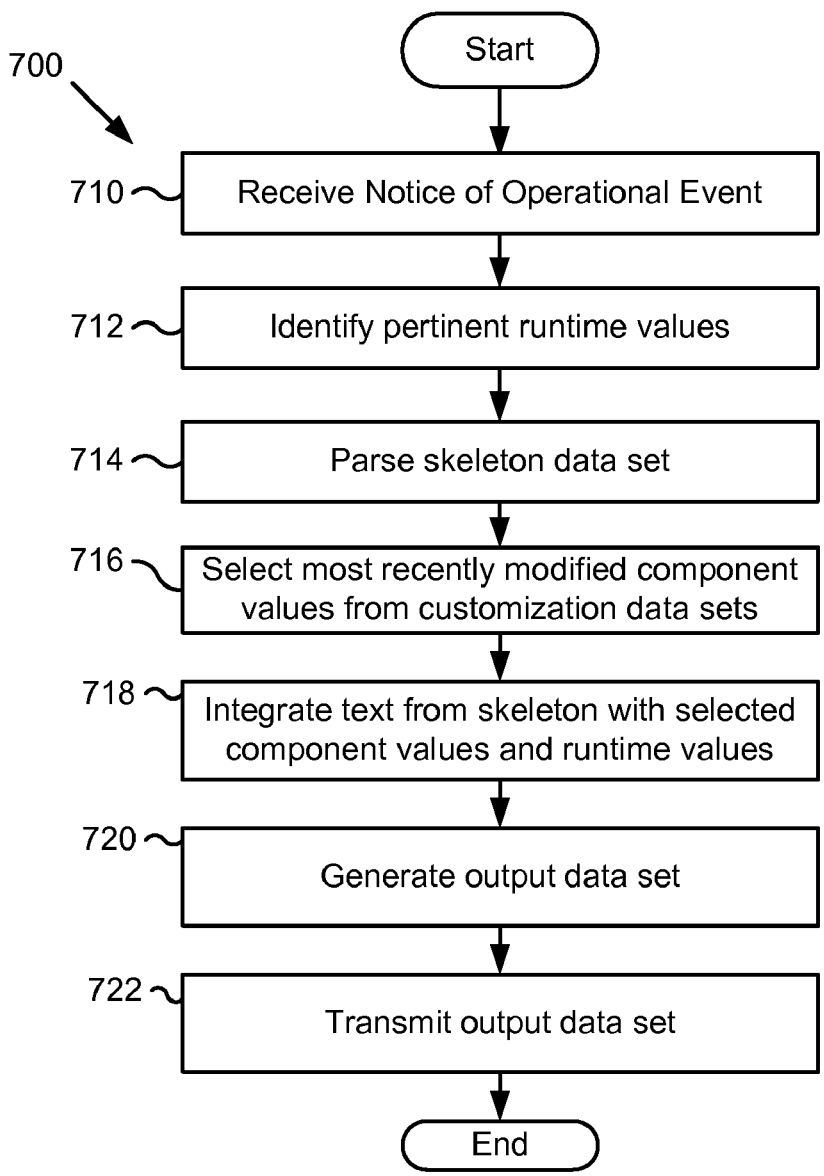
FIG. 7 is a schematic flow chart diagram illustrating one embodiment of a method to handle a reportable operational event in accordance with the present invention.

FIG. 7 depicts a method 700 for handling a reportable operational event consistent with the present invention. The method 700 comprises receiving 710 or detecting a reportable operational event in a mainframe application 112, identifying 712 an associated software module as well as identifying pertinent runtime values present at the time of the reportable operational event, parsing 714 a skeleton data set 210, selecting 716 the most recently modified component values 424 from the customization data sets 410 and runtime values 420, integrating 718 text from the skeleton data set 210 with selected component values 424 and runtime values 420, generating 720 an output data set 250, and transmitting 722 the output data set 250 to specific recipients.

A reportable operational event may be detected by the mainframe application 112 itself, by the mainframe operating system, or by some other mechanism or process. In some embodiments, the reportable operational event is an error condition, illegal operation request, or an abend caused by an attempt to execute an illegal instruction call, an attempt to access non-existent memory, or some other error situation. In one embodiment, the application 112 has an event procedure, exit, or handler that the operating system calls upon detecting a specific operational event such as an error condition or abend. The event procedure may execute the remaining functionality of the method 700. Alternatively, the event procedure may call one or more other procedures, modules, or programs to execute the remaining functionality of the method 700.

The event procedure may identify 712 a related or associated software module. For example, the event procedure identifies the value of the instruction pointer at the time of the reportable operational event and then determines the related module based on a procedure map for the application 112. In addition, the event procedure may record the time of the reportable operational event, the load on the system, the most recent application requests as well as other pertinent runtime values 420.

The event procedure may read and parse 714 a skeleton data set 210. The event procedure may select from a group of skeleton data sets 210 based on the name of the associated module, the event code, or other runtime values 420.

Based on the component fields 320 in the skeleton data set 210, the event procedure selects 716 the most recently modified component values 424 from the customization data sets 410 and from the runtime values 420. In some cases, the same component values 424 may exist in multiple sources (customization data sets 410 and/or runtime values 420). In such cases, the event procedure selects the most recently modified values. The event procedure may select the most recently modified values based on the timestamp associated with each customization data set 410. Alternatively, the customization data sets 410 may store individual timestamps for each component value 424.

The event procedure integrates 718 text fields 310 from the selected skeleton data set 210 and selected component values 424 to generate 720 an output data set 250. In one embodiment, the output data set 250 may substantially resemble the output data set 550 of FIG. 5 comprising text fields 510, completed component fields 520, and optional sections 530.

Finally, the event procedure or other module transmits 722 the output data set 250 to recipients. In one embodiment, the output data set 250 is an email message and the recipients are email mailboxes. In this embodiment, the event procedure selects destination email addresses. The email addresses may be selected from a list in the skeleton data set 210. Alternatively, the destination email addresses may be configured as part of the configuration for the mainframe application 112. Upon receipt of the output data set 250, the email recipients may act upon the received output data sets 250.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer program product for updating an application while preserving end-user customizations, the computer program product comprising a computer readable storage medium storing a computer readable program, wherein the computer program product when executed on a computer causes the computer to:

update the application with a maintenance update, the application comprising an object code data set, a skeleton data set, a user customization data set, and a developer customization data set, the maintenance update comprising one of a text update and a field update for the skeleton data set and no update for the user customization data set and the developer customization data set;

parse the skeleton data set for text and component fields in response to a detected reportable operational event;

integrate the parsed text from the skeleton data set and component values from the user customization data set and component values from the developer customization data set, wherein the component values correspond to the component fields; and generate an output data set comprising the text from the skeleton data set and the integrated component values.

2. The computer program product of claim 1, wherein integrating component values from the user customization data set and the developer customization data set further comprises integrating component values from a plurality of user customization data sets and a plurality of developer customization data sets.

3. The computer program product of claim 2, wherein the computer program further causes the computer to identify an event code associated with the detected reportable operational event and a module name in which the detected reportable operational event is first detected and wherein the skeleton data set from which the parsed text is integrated is selected from a plurality of skeleton data sets according to the event code.

4. The computer program product of claim 1, wherein each component field of the skeleton data set comprises a component token and a component field name, and each component value of the customer customization data set and each component value of the developer customization data set has an associated component field name such that each component field name of the skeleton data set corresponds with a component field name of one of the customer customization data set and the developer customization data set.

5. The computer program product of claim 4, wherein the skeleton data set component field name is human-readable and the component token is an alphanumeric character.

6. The computer program product of claim 1, wherein integrating the text and component values comprises copying the skeleton data set and replacing the component fields with the component values to generate the output data set.

7. The computer program product of claim 1, wherein the computer program product further causes the computer to send the output data set as an email to a user-selectable set of one or more email recipients.

8. The computer program product of claim 1, wherein the skeleton data set comprises fixed-length records and the output data set comprises variable length records, wherein a component value may comprise a series of characters of arbitrary length.

9. The computer program product of claim 1, wherein the skeleton data set comprises fixed-length records and the output data set comprises variable length records, and wherein a component value comprises a universal resource locator (URL) of arbitrary length.

10. The computer program product of claim 9, wherein the URL comprises text and a subcomponent field and the computer program product replaces the subcomponent field with a component value from one of the customer customization data set, the developer customization data set, and runtime values associated with the reportable operational event to form a network usable URL.

11. A computer program product for updating an application while preserving end-user customizations comprising a computer readable storage medium storing a computer readable program, wherein the computer program product when executed on a computer causes the computer to:

update the application with a maintenance update, the application comprising an object code data set, a skeleton data set, a user customization data set, and a developer customization data set, the maintenance update comprising one of a text update and a field update for the skeleton data set and no update for the user customization data set and the developer customization data set;
parse the skeleton data set for text and component fields in response to a detected reportable operational event;
select component values from the user customization data set and the developer customization data set, wherein the component values correspond to the component fields, the user customization data set configured to allow a user to modify the user customization data set, the developer customization data set configured to allow a developer to modify the developer customization data set; and
integrate the parsed text from the skeleton data set and the selected component values from the user customization data set and the selected component values from the developer customization data set, wherein the selected component values correspond to the component fields.

12. The computer program product of claim 11, wherein the skeleton data set is human modifiable and wherein updates to the application that alter the skeleton data set overwrite human modifications to the skeleton data set.

13. The computer program product of claim 11, wherein parsing the skeleton data set occurs in response to detecting an abend condition.

14. The computer program product of claim 13, wherein selecting component values further selects component values related to the abend condition including an abend code and a name of a module in which the abend occurred.

15. The computer program product of claim 12, wherein selecting component values from the user customization data set and the developer customization data set further comprises selecting those component values most recently modified.

16. The computer program product of claim 12, wherein the computer program product further causes the computer to:
accept a user modification to a component value of the user customization data set such that each component value includes a timestamp indicating a modification time of the component value.

17. The computer program product of claim 16, wherein selecting the component values, for a component value that exists in a plurality of customization data sets, selects the component value with the most recent timestamp, wherein the component values in a customization data set that has not been modified each assume a timestamp equal to the creation date of the customization data set and a component value that has been modified assumes a timestamp equal to a modification time specific to the component value.

18. A method for updating an application while preserving end-user customizations, the method comprising:
installing by use of a processor, the application on a computer system comprising, the application comprising:
a parser, an object code data set, a skeleton data set, a developer customization data set, and a client customization data set, wherein the skeleton data set comprises text and a plurality of component fields, and wherein the developer customization data set comprises component values, and wherein the client customization data set comprises component values;
updating the skeleton data set with a maintenance update for the application, the maintenance update comprising one of a text update and a field update, and not updating the client customization data set and the developer customization data set;
detecting a reportable operational event in the computer system;
deriving runtime component values based on the reportable operational event;
parsing the skeleton data set for text and component fields in response to the reportable operational event;
selecting component values from the client customization data set, from the developer customization data set, and from the runtime component values, wherein the selected component values correspond to the component fields of the skeleton data set;
integrating the parsed text from the skeleton data set and the selected component values to generate an output data set comprising the text and the selected component values, wherein the component values correspond to the component fields.

19. The method of claim 18, wherein the computer system further comprises a plurality of client customization data sets and a plurality of developer customization data sets.

20. The method of claim 18 further comprising receiving an abend and wherein the output data set is an abend report.

21. The method of claim 18, wherein each component field of the skeleton data set comprises a component token and a component field name, and each component value of the client customization data set and each component value of the developer customization data set has an associated component field name such that each component field name of the skeleton data set corresponds with a component field name of one of the client customization data set and the developer customization data set.

22. The method of claim 19, wherein detecting thea reportable operational event further comprises identifying an event code associated with the reportable operational event and a module name in which the reportable operational event was first detected and determining a particular skeleton data set from which the pared text is integrated further comprises selecting a skeleton data set from the plurality of skeleton data sets based on the event code.

23. The method of claim 18, wherein generating the output data set further comprises copying the skeleton data set and replacing the component fields of the skeleton data set with the selected component values to generate the output data set.

24. The method of claim 22, wherein the skeleton data set further comprises a pair of component switches enclosing an optional section of text and component fields, and wherein integrating the parsed text from the skeleton data set selectively incorporates the optional section based on a presence of a selected component value associated with the pair of component switches.

25. The method of claim 24, wherein the pair of component switches comprise a begin switch and an end switch.

26. The method of claim 25, wherein the selected component value may be a runtime parameter selected during program execution.

27. A method for updating a mainframe operational event reporting software application while preserving end-user customizations, wherein the mainframe operational event reporting software application comprises an object code data set, a text-based skeleton dataset, a text-based user customization data set, and a text-based developer customization dataset, the method comprising:
replacing, by use of a processor, the object code data set with an updated version of the object code data set; and
replacing the text-based skeleton data set with an updated version of the text-based skeleton data set without replacing or modifying neither the text-based user customization data set and the text-based developer customization data set;

wherein the mainframe operational event reporting software application in response to a detected reportable operational event:

parses the text-based skeleton data set for text and component fields;

integrates text from the text-based skeleton data set and component values from the text-based user customization data set and component values from the text-based developer customization data set, wherein the component values from the text-based user customization data set and the text-based developer customization data set correspond to component fields of the text-based skeleton data set;

generates an output data set comprising the parsed text from the text-based skeleton data set and the integrated component values; and emails the output data set to a set of email addresses.

28. The method of claim 25, the method further comprising making modifications to one of the user customization data set and the developer customization data set prior to replacing the skeleton data set such that the output data set contains the modifications.

29. A system configured for updating an application while preserving end-user customizations comprising:

a mainframe computer comprising a plurality of direct access storage devices (DASDs), a random access memory (RAM), and a plurality of central processing units (CPUs) configured to access the RAM and the plurality of CPU;

a transactional hierarchical database program stored on at least one of the DASDs and configured to run on at least one of the CPUs;

a skeleton data set comprising text and component fields stored on one of the DASDs;

a user customization data set comprising component values stored on one of the DASDs;

a developer customization data set comprising component values stored on one of the DASDs;

a reportable operational event reporting application comprising a parser module, a selection module, an integration module, and an email module, wherein:

the application is stored on one of the DASDs and configured to run on one of the CPUs in response to a reportable operational event in the transactional hierarchical database program, the application receiving a maintenance update comprising one of a text update and a field update for the skeleton data set and no update for the user customization data set and the developer customization data set;

the parser module is configured to parse the skeleton data set for text and component fields;

the selection module is configured to select component values from the user customization data set, the developer customization data set, and runtime component values created as a result of the reportable operational event wherein the component values are selected according to corresponding component fields parsed by the parser module from the skeleton data set;

the integration module is configured to generate an output data set comprising the parsed text from the skeleton data set and the component values selected by the selection module; and the email module is configured to send the output data set as an email to one or more email addresses.

30. The system of claim 29, wherein the runtime component values comprise an event code associated with the reportable operational event and an event module name corresponding to a software module in which the reportable operational event is first detected.

31. The system of claim 30, wherein each component field of the skeleton data set comprises a component token and a component field name, and each component value of the customer customization data set and each component value of the developer customization data set has an associated component field name such that the component field names of the skeleton data set corresponds with component field names of the customer customization data set and the developer customization data set.

32. The system of claim 31, wherein the component field name is a human-readable name and the component token is an alphanumeric character.

33. The system of claim 31, wherein the skeleton data set comprises fixed-length records and the output data set comprises variable length records and wherein a component value may comprise a series of characters of arbitrary length.

34. The system of claim 33, wherein the series of characters comprise a universal resource locator (URL).

35. The system of claim 31, wherein the component token is one or more non-printing characters.

* * * * *